T. B. RICE, Jr.
Field-Roller.

No. 204,376.            Patented May 28, 1878.

WITNESSES:
Henry N. Miller
C. Sedgwick

INVENTOR:
T. B. Rice Jr.
BY Munn & Co.
ATTORNEYS.

UNITED STATES PATENT OFFICE.

THOMAS B. RICE, JR., OF MEDORA, ILLINOIS.

IMPROVEMENT IN FIELD-ROLLERS.

Specification forming part of Letters Patent No. 204,376, dated May 28, 1878; application filed March 18, 1878.

*To all whom it may concern:*

Figure 1:
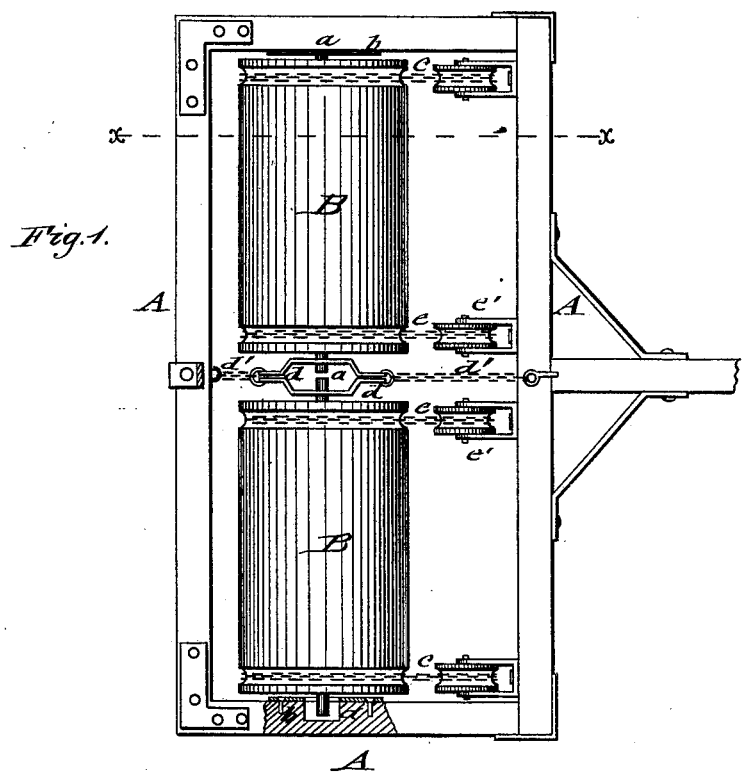
Figure 2:
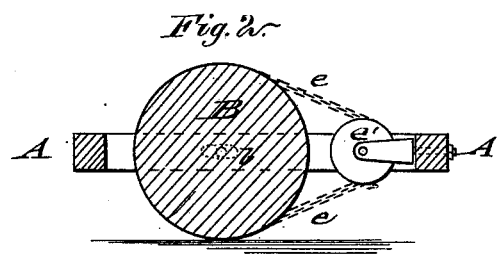

Be it known that I, THOMAS B. RICE, Jr., of Medora, in the county of Macoupin and State of Illinois, have invented a new and Improved Field-Roller, of which the following is a specification:

In the accompanying drawing, Figure 1 represents a top view of my improved field-roller, and Fig. 2 a vertical transverse section of the same on line *x x*, Fig. 1.

Similar letters of reference indicate corresponding parts.

The invention consists of a field-roller made of one, two, or more independent sections, that turn by end gudgeons in slotted holes of the supporting-frame, and in chain-supported center links. Each roller-section is connected by end grooves, chains, or belts with pulleys of the frame, so as to run lighter by the action of the chains.

In the drawing, A represents the frame of my improved field-roller, which is provided at the front part with a tongue, to which the horses are hitched, and at the rear part with a seat for the driver.

The roller is made of two cylindrical sections, B, having gudgeons *a*, of which the outer gudgeons turn in slotted bearings or supports *b* of the side pieces of the frame A, while the inner gudgeons turn in perforated bracket-links *d*, suspended by chain *d'* from the front and rear parts of the frame A. Both sections B are grooved near the ends, and connected by endless chains or wire belts *e* with pulleys *e'* applied to swiveled supports of the front piece of frame A. The endless chains throw the greater part of the draft of the horses on the top of the roller-sections, instead of to the gudgeons, and facilitate thereby the turning of the sections, and produce a lighter running of the rollers than any other of the same weight and capacity. The gudgeons serve merely for the purpose of carrying the weight of the frame and driver, the weight of the latter serving to balance the tongue.

As the roller is made of two sections, which are connected at the center by the bracket-links and slack chains, it is flexible enough to adjust itself readily to the unevenness of the ground. The center chains prevent the roller-sections from coming forward in making their revolutions.

The rollers may be made of any suitable material, and hollow or solid, as desired. The application of the endless chains or belts to the rollers forms the main part of my invention, as thereby the roller-sections are made to turn easily on the ground by distributing the draft around the circumference of the roller and decreasing the friction at the centers.

Having thus described my invention, I claim as new and desire to secure by Letters Patent—

1. In field-rollers, the combination, with a revolving roller, of endless chains or belts, turning in grooves of the roller and passing over front pulleys of the supporting-frame, substantially as and for the purpose described.

2. The combination of independent flexible roller-sections with endless chains or belts and pulleys of the supporting-frame, and with slotted side bearings and central chain-supported bracket-links, substantially as described.

THOMAS BROWN RICE, JR.

Witnesses:
JOSIAH VAUGHN, Jr.,
T. A. LOOMIS.